H. F. KRANTZ.
DOUBLE THROW SWITCH.
APPLICATION FILED MAY 11, 1915.

1,363,658.

Patented Dec. 28, 1920.
2 SHEETS—SHEET 1.

Witnesses:
Richard Wegener.
B. Cooke.

Inventor
Hubert F. Krantz
By Attorney
Albert F. Nathan

UNITED STATES PATENT OFFICE.

HUBERT F. KRANTZ, OF BROOKLYN, NEW YORK, ASSIGNOR TO KRANTZ MANUFACTURING COMPANY, INC., OF BROOKLYN, NEW YORK, A CORPORATION OF NEW YORK.

DOUBLE-THROW SWITCH.

1,363,658.  Specification of Letters Patent. Patented Dec. 28, 1920.

Application filed May 11, 1915. Serial No. 27,298.

*To all whom it may concern:*

Be it known that I, HUBERT F. KRANTZ, a citizen of the United States, and residing at Brooklyn, in the county of Kings and State of New York, have invented a new and Improved Double-Throw Switch, of which the following specification is a full disclosure.

This invention relates to switch operating instrumentalities and it deals with improvements therein effecting a general simplification of the structure thereof and the provision of a greater degree of reliability in its operation.

A primary object within the contemplation of this invention is to devise a way of utilizing the principles underlying the inventions of my Patents 1,248,415, dated Nov. 27, 1917 and 1,306,340, dated June 10, 1919, so that the same certainty of action may be attained by the use of fewer parts, better arranged from a mechanical standpoint.

A more specific object is to create a very simple system embodying a structure providing two rigid positions (as distinguished from the single dead-center of an ordinary toggle) and to utilize this structure in a double-throw switch mechanism.

Another object is to render available a combined hand-operated and magnetic-operated switch designed so as to be capable, if desired, of being used in a way which will embody an automatic circuit-controller for rendering the different solenoids alternately active.

Other objects will be in part obvious from the annexed drawings and in part indicated in connection therewith by the following analysis of this invention.

This invention accordingly consists in the features of construction, combinations of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1:
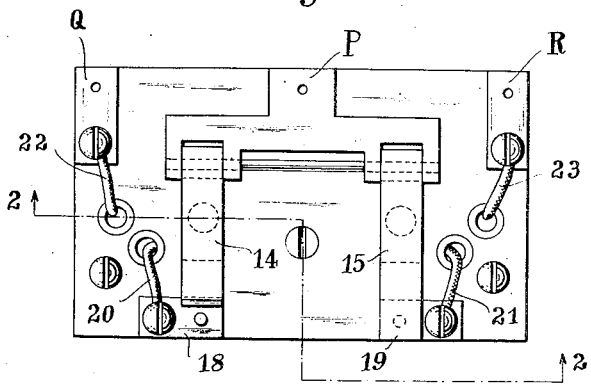
Figure 4:
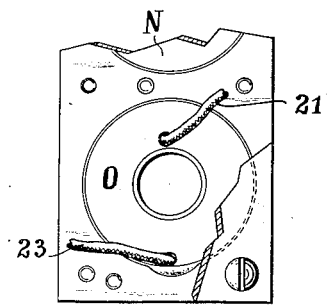
Figure 2:
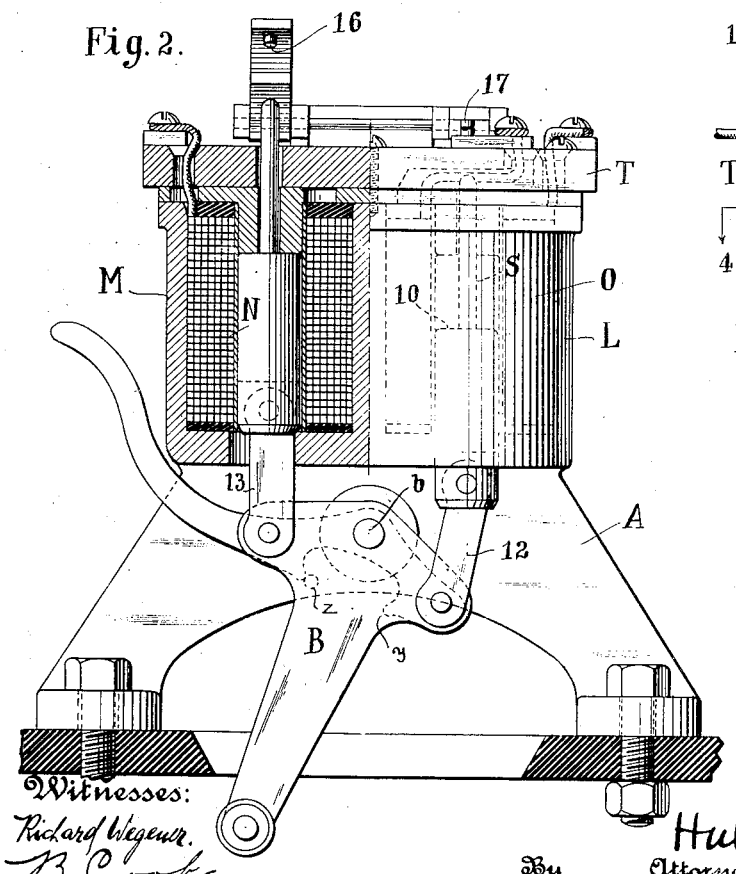
Figure 3:
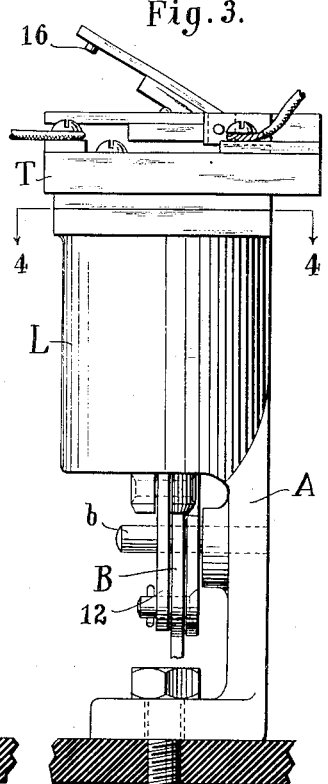
Figure 5:
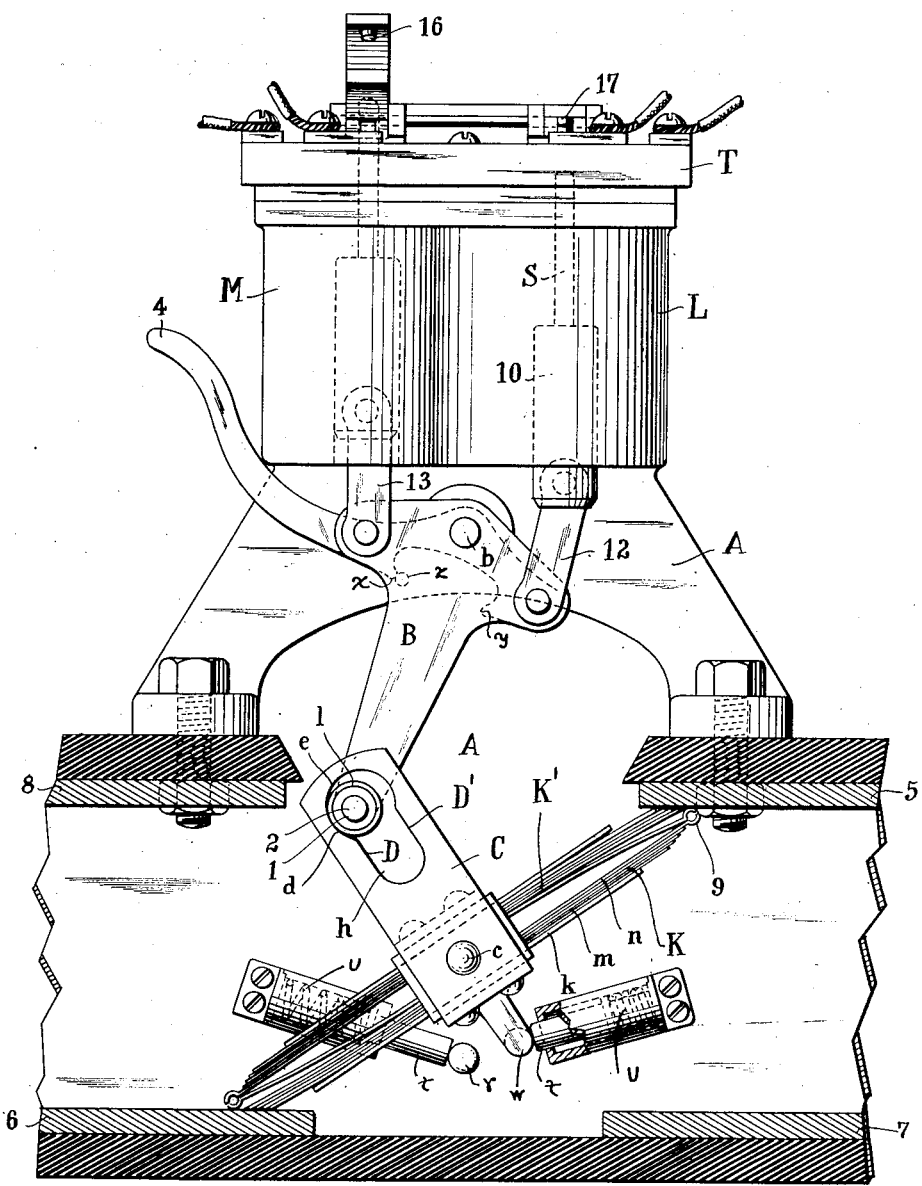

Figure 1 is a plan showing one type of circuit-controller usable in conjunction with a double-throw solenoid switch actuator. Fig. 2 is a fragmentary side elevation partly in section, showing the actuating lever operatively related with the magnetic control. Fig. 3 is a side elevation of the parts shown by Fig. 2. Fig. 4 is a plan of the upper end of the solenoids with a cover plate partly broken away. Fig. 5 is a side elevation of a complete switch mechanism embodying this invention.

Continuing now by way of a more detailed analysis of this invention, it may here be observed that it more particularly contemplates the use of a device composed of two links, each pivoted at one end to the respective one of two pivots that are fixed with relation to each other; the free or swinging ends of said links having a variable contact or engagement with each other so that, depending upon the nature of the engagement, one of said links (herein termed the actuated link) will be incapable under reacting pressures of moving the other link (herein termed the actuating link) when said links are in a certain position, but not when they are in another position. It should be explained that an ordinary toggle is composed of a stationary link (generally formed by the supporting framework), a link swinging about a fixed axis and a third link which is not pivoted to any fixed axis but which, on the contrary, has a floating movement, so to speak. The floating link and the swinging link have their free swinging ends secured together by a pivot which permits of no sliding movement between the two links. This type of toggle has been found to provide a superior switch operating means, as has been more fully disclosed in my above-mentioned copending applications. I have discovered, however, that the variation of this structure, as illustrated in the drawings, and as hereinafter more fully described enables a still further simplification to be attained. That is to say, I have herein disclosed the use of a device consisting of a fixed stationary link (formed by the framework) and of a second and a third link, each of which swings about a fixed axis and which have a coacting variable engagement at their free swinging ends. The actuating link provides a coacting surface in the nature of an abutment, and the actuated link provides a curved surface capable of being impacted at different points by said abutment and so configurated that in at least one position it will oppose the surface of the abutment at what is termed in mechanics "the angle of repose," so that no amount of reactive force will enable the actuated link to throw or swing the other link when the parts are in this rigid or locked position. The opposing surface may, of course, be arranged on the actuated link so that it coacts with the abutment on the other at the angle of repose whenever the links occupy any desired angle with relation to one another or to the stationary link. Thus, the locked position may occur when all three links are substantially in alinement, or it may occur when the swinging links are at any angle with one another, depending upon how this invention is embodied. So also, the swinging links may be approximately of the same length, or one link may be as much longer than the other as may be desired so that the shorter may swing on the far side of its fixed pivot. Preferably, however, the swinging links will have about the same length and actuated link will be provided with duplicate contacting surfaces so as to provide two locking positions at different stations in the swing of the actuated link. In this way, two locking positions are thus provided, and consequently it may be utilized to shift the switch blade into alternate positions, each establishing the desired electrical connection.

The drawings show one of the many possible practical embodiments of this invention.

Referring to Fig. 5 of the drawings, A designates a framework or support which may, if desired, be built up of a number of component parts. Thus, the drawing shows a casting to which is pivoted the part B providing the actuating link and to which is also pivoted the part C providing the actuated link. These pivots are indicated by $b$ and $c$ and they are fixed relatively to the frame A so that the links B and C each have a free swinging movement about the axes $b$ and $c$ as distinguished from the floating movement. These parts may be constructed in any desired manner. Thus, as shown by Fig. 3, the pivot $b$ may be formed of a stud fast to the frame A and entering a hole in the link B, while the link C may be secured to a stud $c$ that is journaled by a hole in the frame A. The link B terminates in a hardened roller 1, suitably mounted as by a stud 2, and the various peripheral portions of this roller form what will be herein termed an abutment. The use of a roller is preferred instead of an immovable projection, because it provides anti-friction characteristics which materially promote the "snap" of the contact-breaking swing of the switch. The actuated link C provides a curved contact surface D having a portion thereof, as indicated by $d$ extending at such an angle that it will impact the abutment 1 at one side of the centerline $2^b$ of the link B so that the effect of a reactive movement of the link C will only be to swing the link B in its non-breaking direction, as for example in the direction of its nearest limit of swing. That is to say, the section of the surface indicated by D extends at the "angle of repose" with relation to the centerline of the link B, when the parts are in the position establishing electrical contact by means of the switch blade.

Consequently, when the parts are in the position shown by Fig. 5, force applied to the link C tending to move it clockwise will be transmitted to the link B by the surface $d$ in such a direction as will tend to turn B clockwise; i. e., to prevent the movement of the link C because a further clockwise movement of the part B is prevented either by a positive stop 3 or by another portion $e$ of the surface D.

In this way, the surface D may be configurated both to positively limit the extreme swing of the member B and to interlock it by means of the portion $d$ with the link C. Further, the portion $d$ which extends at the angle of repose is not sufficiently extensive to interfere with the direct actuation of the link B. That is to say, the link B may be rotated from the position shown in Fig. 5 of the drawings in an anti-clockwise direction by pressing down on the handle 4 and this will have the effect of causing the abutment or roller 1 to "ride up" on the surface $d$ until the angle of repose has been passed, whereupon the roller 1 will pass down along the surface $h$ which extends at a gentle angle in the direction of the radius of the link C and may extend parallel therewith as shown, if desired. Consequently, during this movement the link C will first rotate slightly in an anti-clockwise direction against the reaction of the spring brushes and this movement will be comparatively imperceptible and thereafter the movement will be rapid and extensive and act as a snap switch, so that when the pivots $c$—2—$b$ occupy the same line the switch brushes will be in neutral position. By duplicating the curve D, as indicated by D' on Fig. 5, the device may be given two locking positions, the one on the one side of its centerline and the other on the other side. This may be advantageously utilized for changing electrical circuit connections in various ways. Thus, the circuit between the terminal contact members 5 and 6 may be broken and the circuit between the terminals 7 and 8 may be established alternately.

The switch blade will preferably be formed of the swinging or pivoted type, as shown by Fig. 5, and will preferably extend both sides of its pivot $e$, and this pivot may be located symmetrically or non-symmetrically with respect to the brushes, as may be desired. In the form shown, these brushes are made up of an outer relatively stiff strip $k$ which reinforces a series of intervening progressively shorter thin resilient copper strips $m$ and the latter are in turn reinforced by a relatively stiff strip $n$ which terminates at its extremity in a bead 9, which will be the last part to break contact and which provides sufficient metal to withstand the disintegrating action of the spark. This brush, indicated by K, may be duplicated as indicated by K' and as shown by Fig. 5, thereby providing what is in effect a unitary brush or blade designed to be equally effective in making contact between any two or four different terminals. This brush is therefore equally effective for righthanded or lefthanded work.

The switch mechanism above described may be operated either manually or automatically, as by electro-magnetic means as shown more fully in the drawings. Thus, the upper end of the frame A forms two magnetic fields L and M in the nature of pockets for receiving the coils N and O forming solenoids having armatures or plungers 10 and 11, as shown best by Fig. 2. These plungers are secured by links 12 and 13 to the member B at points located on opposite sides of its pivot $b$ so that it may be swung in opposite directions under the impulse of the one or the other plunger. These plungers, of course, are shifted as one or the other of the electro-magnetic means N and O are energized. The mechanism for controlling the excitation of these solenoids may now be described.

Referring to Fig. 1, P indicates a terminal adapted to be connected with a "common" wire from a suitable source of electricity. Hinged to this terminal member P are two contact elements 14 and 15 which extend over the axis of the plungers 10 and 11 and at their free ends carry suitable contacts 16 and 17 whereby they may be enabled to establish an electrical connection between the terminals 18 and 19 and the member P. Terminals 18 and 19 are respectively connected with the ends 20 and 21 of the solenoids N and O respectively. The other ends of these solenoids are indicated by 22 and 23 and they are connected with the terminals Q and R which are adapted in turn to be connected with leading-in wires. This arrangement is such that as soon as either solenoid has been sufficiently excited to throw the switch, it will be forthwith deenergized so that it cannot interfere with the subsequent operation of its companion solenoid. Thus, if the current be passed from the leading-in wire to the terminal R and then through the solenoid O, it will (when the plunger 10 is down) flow through the contact piece 17, then through the hinged member 15 and to the common leading-in wire connected with the terminal member P. This excitation of the solenoid O will immediately cause the plunger 10 to rise with the effect that the stem or extension S will emerge through the plate T of insulating material, and impact the flap 15 so as to swing it upwardly and break contact at 17. This will not take place, however, until the various parts are moving rapidly under their inertia so that the throw of the switch will be completed without any interference. The uprise of the plunger 10 is effected simultaneously with a depression of the plunger 11 so that the flap 14 is enabled to establish contact with the terminal 18, thus rendering the solenoid N capable of being energized when the current is permitted to flow through the leading-in wire connected with the terminal Q, and in this way the position of the switch blade may again be reversed.

The operating handle 4 is preferably so related to the link B as to provide a sufficient lost motion therebetween to enable the link B to swing freely when started without being restrained or impeded by the handle 4. To this end the handle provides two contact points $x$ and $y$ which are spaced apart sufficiently so that when the one is started the lever B by pressure against the pin $z$ will not prematurely impact against the other contact. In this way the handle 4 is enabled to throw the switch without impeding the rapidity of the movement.

For the purpose of maintaining the switch blades normally in neutral position, as when actuated by the hand lever 4 independently of the magnetic connections, a double acting resilient retaining means is provided. This is shown by Fig. 5 in which $r$ indicates a stud fast to the frame work and projecting sufficiently to terminate in the path of the plungers $t$ to limit the throw thereof. These plungers are suitably mounted and are actuated by expansile springs $u$, and they also are in a position to bear against an arm $w$ projecting from the switch blade. This arm in the neutral positions of the switch blades will register with the stud $r$; in which position it will be maintained by the plungers $t$, and in the event of its being swung to one side, as shown by Fig. 5, the one plunger will be depressed and the other will remain pressed against the stud $r$ so that when the lever B is operated into neutral or "off" position the depressed plunger will bring the arm *w* into registry with the stud *r* and hold it in that position.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure the following combinations of elements, or equivalents thereof, by Letters Patent of the United States:—

1. In an electric switch, a switch blade, a carrier therefor, a pivot for said carrier, an arm projecting rigidly from said carrier to swing therewith, an operating lever for said carrier, a pivot for said operating lever about which said lever swings upon an axis substantially parallel with the axis of the first pivot but spaced therefrom, said lever having a portion thereof projecting into a slot formed in said arm, means to swing the operating lever about its pivot to thereby swing the arm from a position at one side of a straight line between said pivots to a position at the opposite side of such a line, resilient means yieldingly tending to retain the arm in an intermediate position, and the walls of said slot having parts to coöperate with the portion of said lever which projects into said slot adapted to lock the arm in either of its positions against movement by said resilient means.

2. In an electric switch, a switch blade, a carrier therefor, a pivot for said carrier, an arm projecting rigidly from said carrier to swing therewith, an operating lever for said carrier, a pivot for said operating lever about which said said lever swings upon an axis substantially parallel with the axis of the first pivot but spaced therefrom, said lever having a portion thereof operatively engaging a portion of said arm, means to swing the operating lever about its pivot to thereby swing the arm from a position at one side of a straight line between said pivots to a position at the opposite side of such a line, resilient means yieldingly tending to retain the arm in an intermediate position, and said operating lever and said arm having coöperative portions adapted to lock the arm in either of its positions against movement by said resilient means.

3. In an electric switch, a switch blade, a carrier therefor, a pivot for said carrier, an arm projecting rigidly from said carrier to swing therewith, an operating lever for said carrier, a pivot for said operating lever about which said lever swings upon an axis substantially parallel with the axis of the first pivot but spaced therefrom, said lever having a portion thereof operatively engaging a portion of said arm, opposingly acting means to swing the operating lever about its pivot to thereby swing the arm from a position at one side of a straight line between said pivots to a position at the opposite side of such a line, resilient means yieldingly tending to retain the arm in an intermediate position, and said operating lever and said arm having coöperative portions adapted to lock the arm in either of its positions against movement of said resilient means.

4. In an electric switch, a switch blade, a carrier therefor, a pivot for said carrier, an arm projecting rigidly from said carrier to swing therewith, an operating lever for said carrier, a pivot for said operating lever about which said lever swings upon an axis substantially parallel with the axis of the first pivot but spaced therefrom, said lever having a portion thereof operatively engaging a portion of said arm, opposingly acting means to swing the operating lever about its pivot to thereby swing the arm from a position at one side of a straight line between said pivots to a position at the opposite side of such a line, resilient means yieldingly tending to retain the arm in an intermediate position, said operating lever and said arm having coöperative portions adapted to lock the arm in either of its positions against movement by said resilient means, and a manually operable control member for said lever having lost motion connection with said lever.

5. In an electric switch, a switch blade carrier, a pivot for said carrier, an arm projecting rigidly from said carrier to swing therewith, an operating lever for said carrier, a pivot for said operating lever about which said lever swings upon an axis substantially parallel with the axis of the first pivot but spaced therefrom, said lever having a portion thereof engaging said arm to swing therewith from an operative position at one side of a straight line between the pivots to an operative position at the opposite side of such a line, resilient means adapted to cause said arm to move from one of its operative positions to an intermediate position, and the mentioned portions of said arm and lever being of a character to lock the arm against movement from either of its operative positions except upon the application of a moving force upon said lever.

6. In an electric switch, a switch blade carrier, a pivot for said carrier, an arm projecting rigidly from said carrier to swing therewith, an operating lever for said carrier, a pivot for said operating lever about which said lever swings upon an axis substantially parallel with the axis of the first pivot but spaced therefrom, said lever having a portion thereof engaging said arm to swing therewith from an operative position at one side of a straight line between the pivots to an operative position at the opposite side of such a line, resilient means adapted to cause said arm to move from one of its operative positions to an intermediate position, the mentioned portions of said arm and lever being of a character to lock the arm against movement from either of its operative positions except upon the application of a moving force upon said lever, and the mentioned resilient means comprising a switch blade carried by said carrier.

7. In an electric switch, a switch blade carrier, a pivot for said carrier, an arm projecting rigidly from said carrier to swing therewith, an operating lever for said carrier, a pivot for said operating lever about which said lever swings upon an axis substantially parallel with the axis of the first pivot but spaced therefrom, said lever having a portion thereof engaging said arm to swing therewith from an operative position at one side of a straight line between the pivots to an operative position at the opposite side of such a line, resilient means adapted to cause said arm to move from one of its operative positions to an intermediate position, the mentioned portions of said arm and lever being of a character to lock the arm against movement from either of its operative positions except upon the application of a moving force upon said lever, and resilient means tending to hold said arm in an intermediate position.

8. An electric switch comprising a pivoted switch blade carrier movable into two operative positions, a flexible switch blade projecting radially from the pivotal axis of said carrier, a contact with which said blade engages when the carrier is in one of its operative positions, operating means to hold the carrier swung into one of its operative positions with the switch blade flexed against said contact whereby to store energy in the switch blade tending to move the carrier into an intermediate position, and said operating means and said carrier having coöperative parts to lock the carrier in either of its operative positions.

9. An electric switch comprising a pivoted switch blade carrier movable into two operative positions, a flexible switch blade projecting radially from the pivotal axis of said carrier, a contact with which said switch blade engages when the carrier is in one of its operative positions, operating means to hold the carrier swung into one of its operative positions with the switch blade flexed against said contact whereby to store energy in the switch blade tending to move the carrier into an intermediate position, the operating means being movable to release the stored energy in the switch blade, means whereby the operating member will retain the carrier in its opposite position, and means for operating the operating member.

In witness whereof, I hereunto subscribe my name, as attested by the two subscribing witnesses.

HUBERT F. KRANTZ.

Witnesses:
 ROBT. A. WILLARD,
 JOHN L. KOLLE.